Sept. 10, 1940.   N. TRBOJEVICH   2,214,493
SCREW AND NUT MECHANISM FOR STEERING GEARS
Filed April 13, 1939
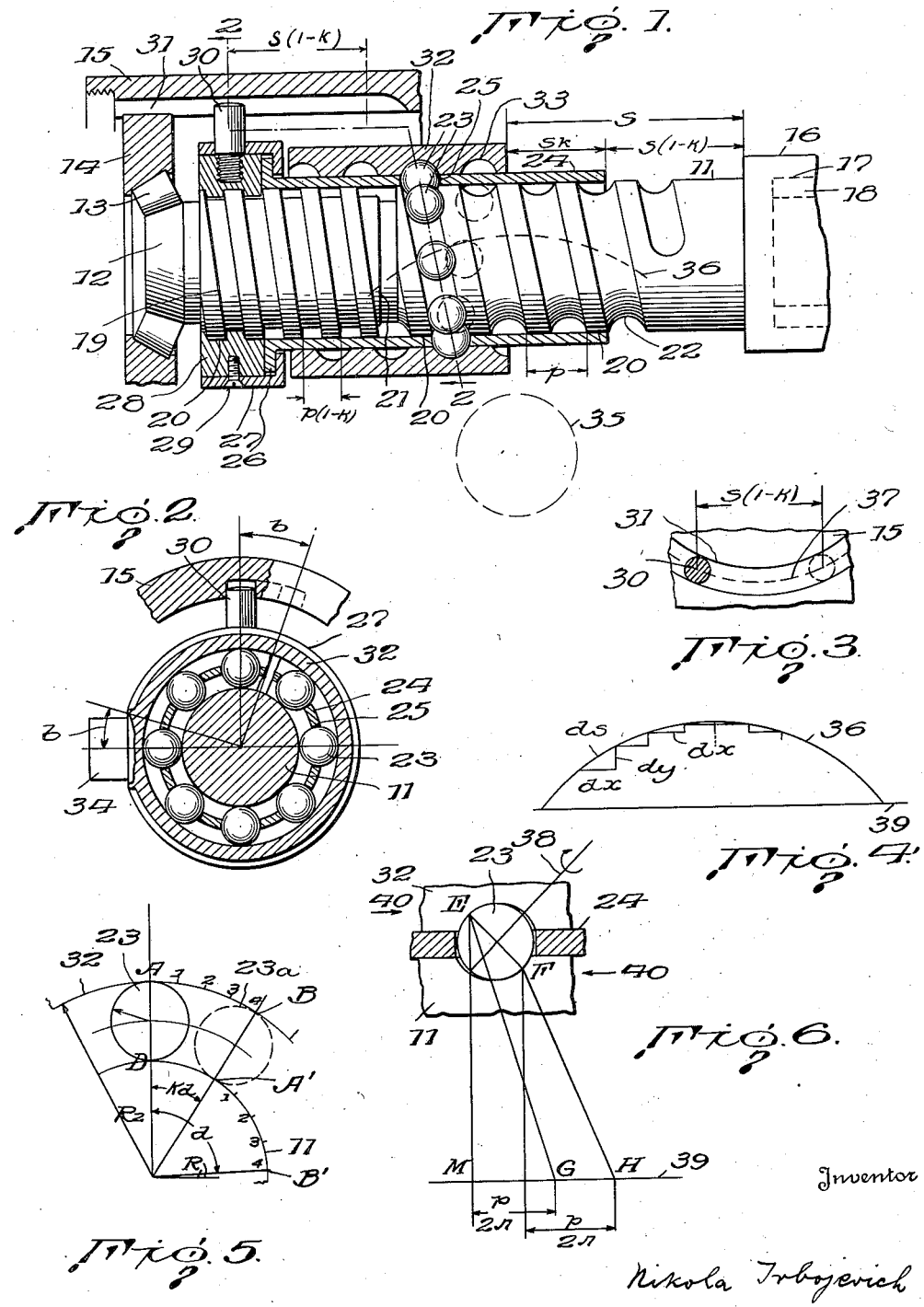
Inventor
Nikola Trbojevich Patented Sept. 10, 1940

2,214,493

UNITED STATES PATENT OFFICE 2,214,493

SCREW AND NUT MECHANISM FOR STEERING GEARS

Nikola Trbojevich, Detroit, Mich.

Application April 13, 1939, Serial No. 267,666

4 Claims. (Cl. 74—459)

This invention relates to a screw, ball and nut mechanism which is particularly adapted for actuating the link mechanism of steering gears, and for other similar purposes.

The subject matter is a continuation in part of my former invention described in my copending application for patent, Serial No. 251,239, filed January 16, 1939. In that application I advanced the idea of mounting all balls intervening the nut and screw in a floating sleeve member equipped with two flanges at a predetermined distance from the corresponding ends of the nut whereby the position of the sleeve at the end of each stroke would be corrected by the motion of the nut thus compensating for the slippage of the balls and any other deviation from the calculated rolling motion.

I shall now describe a mechanism in which the said sleeve member is positively guided at all times, thus preventing the slippage of the balls in any position. This continuous correction and guidance of the balls is accomplished in infinitesimal steps by means of a differential screw and nut in this preferred construction. However, the novelty resides in the mechanical principle itself rather than in its any particular embodiment.

The object of this invention is to constantly control the rolling of all balls in order to insure a smooth and safe operation of the mechanism.

Another object is to reduce the number of balls employed. Heretofore, in mechanisms of this kind some balls were doing the actual work while others were returning through a channel. In this construction all balls are simultaneously active.

Another object is to construct a modification in which only one row of balls is used, as in a ball bearing. This arrangement renders the mechanism available for low priced vehicles on account of its reduced size and cost.

Still another object is to assemble the balls under an initial pressure which object is now feasible on account of the limited number of and the geared control over the said balls.

In the drawing:

Figure 1 shows the elevation in cross section of the improved mechanism.

Figure 2 is the cross section of Figure 1 taken in the helix 2—2 passing through the ball centers.

Figure 3 is a fragmentary and diagrammatic view of the detail comprising the curved slot guiding the differential nut pin shown in Figures 1 and 2.

Figures 4, 5 and 6 are geometrical diagrams explanatory of the calculations found in the description.

As is shown in Figures 1 and 2, the screw 11 consists of a cylindrical body and two integral extensions, one at each end of the same, whereby the said screw may be rotatably mounted in two bearings in a housing. The left end extension comprises a conical race 12 upon which a plurality of taper rollers 13 held in the outer race 14 and in the housing 15, are mounted. At the right end of the screw a larger cylindrical shank 16 is formed, the said shank being provided with a bore 17 into which the steering tube 18, usually manually operated from the steering wheel, is fitted. The outer circumference of the said shank may be used for mounting upon a convenient ball or roller bearing, not shown in the drawing.

The central part of the said screw 11 is provided with two screw threads arranged side by side, of the same hand but of a different contour and lead. The screw thread 19 on the left side is preferably a square thread or, at least, a thread so formed that considerable cylindrical bearing areas 20 are left uncut at its outer circumference. At the other side of the gap 21 which forms the dividing line between the two threads, the main thread 22 is formed, said thread having a hollow circular cross contour corresponding to the balls 23 and also has the above mentioned cylindrical bearing areas 20 lying between its grooved portions.

The sleeve 24 is a cylindrical shell smoothly finished all over in order to provide bearing surfaces contacting the uncut areas 20 of the threads 19 and 22 with its inner circumference and the similarly formed contact areas 20 in the nut thread 33 with its outer circumference. A plurality of smoothly reamed circular perforations 25 are further formed in its wall, said perforations being aligned along one full convolution of the helix substantially lying in the central portion of the broken plane 2—2 and each encircling a ball 23 with an accurate and snug fit. The left end of the sleeve 24 is formed into a flange 26, the said flange contacting with its two sides, the inner wall of the shell 27 and the flank of the differential nut 28, respectively. The nut 28 meshes with the differential thread 19 and is bolted at its circumference by means of the screws 29 to the said shell 27. At a certain point of its circumference, the said nut is provided with a guide pin 30 engaging the corresponding longitudinal slot 31 formed in the wall of the housing 15 whereby the said nut is prevented from rotating, but it may freely translate in the axial direction of the screw. The nut 28 and the sleeve 24 thus form a single unit in which the two portions are freely rotatable relatively one to the other, but the total length of the two members remains unchanged during any such rotation.

The main nut 32 is a circular shell having a thread 33 formed in its inner circumference throughout its entire length, the said thread exactly corresponding in its hand, pitch and cross contour to the already described main thread 22. At the outer circumference of the said nut, an outwardly extending journal 34 is formed integrally with the same by means of which the nut may be connected to the steering linkage of the vehicle, preferably by means of spherical bushing mounted upon the journal 34 and a lever connected to the steering cross shaft 35 diagrammatically shown by means of a dotted circle, as was fully described and illustrated in my above cited copending application for patent. If the connection between the nut and the steering shaft be of the indicated kind, the path of the journal 34 will be a circular arc 36 concentric with the dotted circle 35, Figure 1, and the nut 32 will then rock through an angle $b$, Figure 2, as it translates throughout the stroke S. It is now necessary to cause the differential nut 28 to rock in unison wtih the main nut 32, i. e., with the same amplitude $b$. This is accomplished by forming the groove 31 which guides the pin 30 to conform with a longitudinally disposed curve 37 in such a manner that the two nuts, while translating with different linear velocities, will both rock through the same angle $b$ at any one instant, see Figure 3. It is true that this same movement could be accomplished more directly by connecting the two nuts 28 and 32 by means of a sliding-driving coupling such as a spline, but I prefer the arrangement shown in Figure 1 for certain minor practical reasons, such as the ease of assembling the parts.

The action of the mechanism will be understood from this. When the screw 11 is rotated in its bearings with a unit angular velocity, one unit for each complete turn, the main nut 32 will translate with a linear velocity $p$ (thus temporarily disregarding the rocking action), where $p$ denotes the pitch of the main screw thread 22. At the same time, the sleeve member 24 containing the balls 23 will rotate with a velocity $k$ and translate with a velocity $p$ $(1-k)$, where $k$ is what I term, the rolling coefficient of the device, the value of which coefficient is always less than one-half, usually about .4 and which value can be exactly determined by calculation as it will be presently shown.

The geometrical principle underlying this invention consists in constraining the sleeve member to translate with a velocity $p$ $(1-k)$ relative to the rotary screw 11. If this be done, the sleeve will also simultaneously rotate of necessity with an angular velocity $k$, because it cannot get out of the main helix by the virtue of the interposed balls. The translation of the sleeve 24 is accomplished by means of the differential nut 28 which being mounted upon the thread 19 of the exact lead $p$ $(1-k)$ and also being prevented from rotating by means of the guide pin 30 and the slot 31 must translate with the linear velocity $p$ $(1-k)$. By means of the coupling shell 27 and the sleeve flange 26 the nut, thus, pulls or pushes the sleeve with the said predetermined linear velocity while the sleeve, in addition, rotates with the angular velocity $k$ thus enabling and also compelling, all balls to roll in their grooves.

From this the corresponding lengths of the cooperating members may be determined. In Figure 1 the nut 32 is shown in its extreme left position and, upon rotating the screw 11 clockwise it begins to translate to the right for the stroke S. During this period the differential nut 28 and the sleeve 24 coupled thereto will describe the path S $(1-k)$. The length of the sleeve 24 exceeds the length of the main nut 32 by a distance $Sk$, for which reason both members will arrive at the end of the stroke at the same time, the nut overtaking the sleeve in the end. The balls 23 which occupy the leading convolution of the nut helix at the beginning of the stroke S, will gradually fall behind and will occupy the last convolution at the end of the stroke, the distance between the first and last positions of the balls relative to the nut being equal to $Sk$.

The rocking motion of the nut does not affect the rolling of the balls providing that the two nuts 32 and 28 respectively are so coupled together that they both rock simultaneously and with the same amplitude, as it will be now explained.

In Figure 4 the absolute path element $ds$ along the curve 36 may be subdivided into a series of infinitesimal translations $dx$ along the worm axis 39 and another series of rotations $dy$ perpendicular thereto. During the periods of translation (of the nut) the worm, not being able to translate, must equivalently rotate thus producing a relative sliding. However, during the elementary periods of rotation $dy$ both elements rotate together with the balls and the relative motion between all these members is nil.

I shall now calculate the exact value of the rolling coefficient $k$. In Figure 5 the outer circle 32 is stationary while the inner circle 11 rotates through the arc DB' describing the angle $d$. During this period the ball 23 rolls without slipping into the position 23a represented with a dotted circle describing the arc DA' or the angle $kd$. This defines the meaning of coefficient $k$.

The developed arc lengths AB and A'B' in the outer and inner circles respectively are equal, from which with reference to the Figure 5, the following three equations may be written down by inspection:

$$k = \frac{\text{arc } DA'}{\text{arc } DB'} \qquad (1)$$

$$\text{arc } DA' = \frac{R_1}{R_2} \text{arc } AB \qquad (2)$$

$$\text{arc } DB' = \text{arc } DA' + \text{arc } AB \qquad (3)$$

From the above three equations the three arc lengths DA', DB' and AB can be eliminated, thus leaving the equation $$k = \frac{R_1}{R_1 + R_2} \qquad (4)$$

It is now necessary to make two distinct corrections in computing the value of $k$. First, the balls 23 do not, as a rule, contact their helical grooves at the points A and D lying diametrically opposite in a line perpendicular to the screw axis but rather, they lie at two intermediate points E and F, as shown in Figure 6. Second, the arc lengths of the two helixes passing through the contact points E and F respectively, are not equally proportional to their corresponding radii because each has a different helix angle.

In particular, in Figure 6 let the contact points

E and F be selected as the points of concentration of the axial thrusts 40 at which points it is desired to roll the ball without slipping. Upon rotating the members 32 and 11 about the axis 39 in opposite directions, the ball 23 will rotate about the momentary axis 38 and the developed helical arc lengths passing through the points E and F will be of the same length and correspond to the circular arcs AB and A'B' in Figure 4. In other words, I must substitute in the Equation 4 for the values of radii R₂ and R₁ certain values EG and FH respectively, which are proportional to the lengths of helical arcs passing through the points E and F. This can be done by calculation or graphically as shown in Figure 6. If EM be the radius of the helix E, I lay off perpendicular thereto in the axis 39 the distance $$MG = \frac{p}{2\pi}$$

The hypotenuse EG will be then proportional to the arc length of the first helix. The second hypotenuse FH is obtained by a similar construction, as shown. The exact value of the coefficient $k$ will then be:

$$k = \frac{FH}{FH + EG} \qquad Q.\ E.\ D. \qquad (5)$$

It is to be noted that in this mechanism it is not only possible to control the general motion of the balls, but it also is possible to preselect the helixes E and F along which the balls should roll. This feature may be practically useful for two reasons. First, the points E and F may be preselected as the foci of maximum stress concentration, thus reducing the frictional energy loss to a minimum. Second, in a certain existing ball race, it might be desirable to artificially shift the point of rolling away from the edge of the race.

What I claim as new is:

1. A screw and nut mechanism comprising a rotatable screw having a main screw thread and a differential screw thread of a lesser lead formed at its circumference, a nut engaging the differential thread, a cylindrical sleeve member enveloping the screw and containing a plurality of balls rotatably housed in its wall in a plurality of perforations, a main nut having the same lead as the said main thread and capable of contacting the balls which in turn contact the said main thread, means for synchronizing the rotation, if any, of the differential and the main nuts and means for operatively connecting the differential nut to the sleeve by means of a relatively rotatable but not axially movable connection.

2. A screw and nut mechanism comprising a rotatable screw having an external helical ball groove and a differential screw thread of a lesser pitch formed thereupon, a plurality of balls in the said groove, a tubular sleeve member having a plurality of perforations and contacting the said balls with its side wall in the said perforations, a nut having an internal ball groove and contacting the balls at their surfaces protruding from the sleeve member, another nut meshing with the differential thread and rotatably but not axially movably engaging the said sleeve member and means for synchronizing the rotations of the two nuts.

3. A screw and nut mechanism comprising a screw and a nut having cooperating helical ball grooves, a tubular sleeve intervening the said members and containing a plurality of balls rotatable in the perforations formed in the sidewall of the said sleeve and also in the said two cooperating ball grooves, an auxiliary differential screw and nut mechanism so connected to the main device that the differential screw rotates in a timed relation with the main screw and the differential nut translates with a linear velocity less than that of the main nut and means for rotatably connecting the said differential nut to the sleeve member whereby the said sleeve is constrained to translate in unison with the said differential nut.

4. A screw and nut mechanism comprising a cooperating screw and nut each having a helical ball groove comprising a plurality of convolutions, a plurality of rolling balls in the said grooves, the said balls forming fewer helical convolutions than the said nut and screw, an intervening tubular sleeve member enveloping the screw and enveloping the said balls substantially at their mid portions and means for translating the said sleeve in the direction of the relative translation of the said nut with a reduced velocity and in a timed relation.

NIKOLA TRBOJEVICH.